United States Patent Office 2,759,030
Patented Aug. 14, 1956

2,759,030
PREPARATION OF MONO-ALKYLATED AROMATIC COMPOUNDS

Louis Schmerling, Riverside, Ill., assignor to Universal Oil Products Company, Des Plaines, Ill., a corporation of Delaware No Drawing. Application December 23, 1954, Serial No. 477,385

20 Claims. (Cl. 260—671)

This invention relates to a process for the mono-alkylation of aromatic compounds and more particularly to a process for improving the yields of mono-alkylated aromatic compounds.

An object of this invention is to prepare mono-alkylated aromatic compounds by reacting a haloalkene with an alkylatable aromatic compound and a saturated hydrocarbon.

A further object of this invention is to improve the yields of mono-alkylated aromatic hydrocarbons obtained by reacting a haloalkene with an alkylatable aromatic compound containing a replaceable hydrogen atom and a saturated hydrocarbon containing a tertiary carbon atom.

One embodiment of this invention resides in a process for the production of derivatives of aromatic compounds by reacting an aromatic compound with a haloalkene and a saturated hydrocarbon containing a tertiary carbon atom, in the presence of a Friedel-Crafts type catalyst, and recovering the resultant aromatic derivatives.

A specific embodiment of this invention is found in a process for preparing derivatives of benzene by reacting benzene with a chloroalkene and a paraffinic hydrocarbon containing a tertiary carbon atom in the presence of aluminum chloride, and recovering the resultant benzene derivatives.

Another specific embodiment of this invention is found in a process for preparing derivatives of benzene by reacting benzene with a chloroalkene and an alkylcycloparaffin, in the presence of aluminum chloride, and recovering the resultant benzene derivatives.

A more specific embodiment of the invention resides in a process for preparing derivatives of benzene which comprises reacting benzene with allyl chloride and methylcyclopentane in the presence of aluminum chloride, and recovering the resultant n-propylbenzene and (methylcyclopentyl) benzene.

Other objects and embodiments referring to alternative haloalkenes and to alternative saturated hydrocarbons containing a tertiary carbon atom will be referred to in the following further detailed description of this invention.

It has now been discovered that the yields of mono-alkylated aromatic compounds resulting from the alkylation of an alkylatable aromatic compound containing a replaceable hydrogen atom with a haloalkene will be greatly improved by the addition of a saturated hydrocarbon containing a tertiary carbon atom (or a saturated hydrocarbon which isomerises under the reaction conditions to form a hydrocarbon containing a tertiary carbon atom) to the reaction mixture. It is to be understood that the term "mono-alkylated aromatic compounds," as used in this invention, refers to aromatic compounds in which a hydrogen atom is replaced by an alkyl, cycloalkyl, cycloalkylalkyl or aralkyl radical.

The saturated hydrocarbons are useful as a part of the reaction due to the fact that they act as hydrogen donors, and are condensed with the aromatic compound, thereby increasing the yield of the alkylated aromatic compounds. For example, the way in which the saturated hydrocarbon enters into the reaction is illustrated by the equation set forth below:

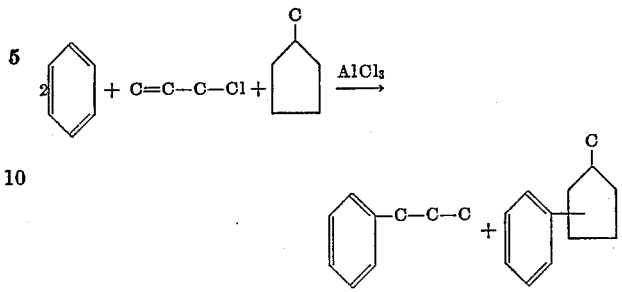

In the absence of the saturated hydrocarbon, the chief mono-substitution product is (2-chloropropyl) benzene.

Suitable saturated hydrocarbons which may be used in the process of this invention include isobutane, isopentane, 2-methylpentane, 3-methylpentane, 2,3-dimethylbutane, methylhexanes, 2,3-dimethylhexane, etc.; cycloparaffins such as methylcyclopentane, methycyclohexane, methylcycloheptane, ethylcyclopentane, propylcyclopentane, ethylcyclohexane, propylcyclohexane, dimethylcyclopentanes, diethylcyclopentanes, dimethylcyclohexanes, diethylcyclohexane, polyalkylcycloalkanes, decahydronaphthalene, etc.

The alkylating agents in the process of this invention comprise haloalkenes, said term "haloalkenes" including both mono- and polyhaloalkenes and cycloalkenes. These haloalkenes (the preferred halogen atom comprising chlorine and bromine) include chloroethylene, bromoethylene, 1,1-dichloroethylene, 1,1-dibromoethylene, trans - 1,2 - dichloroethylene, cis - 1,2 - dichloroethylene, trans-1,2-dibromoethylene, cis-1,2-dibromoethylene, 1, 1,2-trichloroethylene, 1,1,2 - tribromoethylene, allyl chloride, allyl bromide, 1,2-dichloro-1-propene, 1,2-dibromo-1-propene, 2,3-dichloro-1-propene, 2,3-dibromo-1-propene, 1,1,2 - trichloro - 1 - propene, 2,3,3-tribromo-1-propene, crotyl chloride, crotyl bromide, isocrotyl chloride, isocrotyl bromide, methallyl chloride, methallyl bromide, 1,2-dichloro-1-butene, 1,2-dibromo-1-butene, 1,2-dichloro-2-butene, 1,2-dibromo-2-butene, 1,1,2-trichloro-2-butene, 1,1,2-tribromo-2-butene, 3,4-dichloro-1-butene, 3,4-dibromo-1-butene, 2,3-dichloro-1-butene, 2,3-dibromo -1 - butene, 2,3 - dichloro-2-butene, 2,3 - dibromo-2-butene, trichlorobutylenes, tribromobutylenes, etc. In addition, halocycloalkenes may also be used as alkylating agents in this reaction, said unsaturated compounds including 1-chloro-1-cyclohexene and other chlorocyclohexenes, 1,2-dichloro-1-cyclohexene, 1,3,5 - trichlorocyclohexene, 1-bromo-1-cyclohexene and other bromocyclohexenes, 4,5-dibromo-1-cyclohexene, chlorocycylopentenes, bromocyclopentenes, etc.

Aromatic hydrocarbons which may be alkylated by the aforementioned alkylating agents in the process of this invention are those which contain a replaceable hydrogen atom and include benzene, toluene, xylenes, 1,2,3-trimethylbenzene, 1,2,4-trimethylbenzene, etc., ethylbenzene, propylbenzenes, butylbenzenes, etc.; 1,2-diethylbenzene 1,2,3-triethylbenzene, 1,2,4-triethylbenzene, 1,2-dipropylbenzene, 1,3-dipropylbenzene, 1,4-dipropylbenzene, 1,2,3-tripropylbenzene, 1,2,4-tripropylbenzene, isopropylbenzene, p-cymene, etc.; naphthalene, 1-methylnaphthalene, 2-methylnaphthalene, 1-ethylnaphthalene, 2-ethylnaphthalene, 1-propylnaphthalene, 2-propylnaphthalene, etc.; 1,4-dimethylnaphthalene, 1,2-diethylnaphthalene, 1,5-dipropylnaphthalene, etc.; 1,2,3-trimethylnaphthalene, 1,2,4-trimethylnaphthalene, 1,2,3-triethylnaphthalene, etc.; 1,2,3,4-tetrahydronaphthalene; indene, indan, etc.; anthracene, 1-methylanthracene, 2-methylanthracene, 1-ethylanthracene, 2-ethylanthracene, 9,10-dimethylanthracene, 1,2-diethylanthracene, etc.; 9,10-dipropylanthracene, etc.; phenanthrene, 1-methylphenanthrene, 2-methylphenanthrene, etc.; 1-ethylphenanthrene, 2-ethylphenanthrene, etc.; 1,2-dimethylphenanthrene, 1,3-dimethylphenanthrene, 1,2-diethylphenanthrene, etc.; chrysene, 1-methylchrysene, 2-methylchrysene, 1,2-dimethylchrysene, 1,3-diethylchrysene, etc.; pyrene, 1-methylpyrene, 2-methylpyrene, etc.; 1-ethylpyrene, 2-ethylpyrene, etc.; 1,2-dimethylpyrene, etc. It is understood that the above mentioned aromatic hydrocarbons are set forth only as examples of the compounds which may be used in this process and that any aromatic compounds which will undergo alkylation with an alkylating agent under the conditions of this invention may be used in the process of the present invention. This will include substituted aromatic compounds other than those enumerated above such as the phenols, anilines, halogen-substituted benzenes such as chlorobenzene, bromobenzene, dichlorobenzene, dibromobenzene, etc., and the like.

The reaction conditions under which the process of the present invention proceeds will depend largely upon the reactants and the catalyst used. The reaction is usually catalyzed by the use of a Friedel-Crafts type catalyst, the preferred catalyst comprising aluminum chloride, aluminum bromide, zirconium chloride, and boron fluoride, although other metallic halides of this class such as ferric chloride may be used, however, but not necessarily with equivalent results. Generally, temperatures ranging from about —20° to about 150° C. or more will be used in the reaction, the preferred range, especially when aluminum chloride is used to catalyze the reaction, being in the range of from about —20° to about +80° C.

The process of this invention may be effected in any suitable manner and may comprise either a batch or continuous type operation. When a batch type operation is used, a quantity of the starting material, namely, the alkylating agent, the aromatic hydrocarbon and the saturated hydrocarbon containing a tertiary carbon atom are gradually added to a mixture of the aromatic hydrocarbon and the catalyst in a suitable reaction vessel provided with stirring means. The vessel is then heated or cooled to the desired temperature depending upon the reactants and catalysts used in the process. After a predetermined reaction time has elapsed, the desired reaction product is separated from the catalyst layer and recovered from the unreacted starting material by conventional means, for example, by washing, drying and fractional distillation.

Another method of operation of the present process is of the continuous type. A particularly suitable type of operation comprises a fixed bed type in which the condensation catalyst is disposed as a bed in a reaction zone, said zone being maintained at suitable operating conditions of temperature and pressure. The aromatic compound, saturated hydrocarbon and the alkylating agent are passed therethrough in a continuous stream in either an upward or downward flow. Alternatively, a mixture of aromatic compound, saturated hydrocarbon and catalyst in one stream, and the alkylating agent, dissolved if so desired in aromatic compound or saturated hydrocarbon, in another stream are introduced into the reaction zone. The alkylation of the aromatic hydrocarbon will continue until the desired time has elapsed after which the reaction product will be continuously withdrawn from the reaction zone, the liquid product separated from the catalyst and distilled to yield unreacted alkylating agent, aromatic compound and the saturated compound, the latter three being recycled for use as a portion of the starting material while the monoalkylated aromatic compounds will be withdrawn and purified by conventional means hereinbefore set forth. The reaction zone in which the reaction takes place will be an unpacked vessel or coil or it may contain a solid adsorbent such as fire brick, alumina, dehydrated bauxite, and the like.

Other continuous types of processes which may be used in this invention include the fluidized type of operation, the compact moving bed type of operation and the slurry type process.

The following examples are given to illustrate the process of this invention which, however, are not intended to limit the generally broad scope of the present invention in strict accordance therewith.

*Example I*

A solution comprising 97 g. of trans-dichloroethylene dissolved in 40 g. of benzene was added during 2.5 hours with stirring to a mixture consisting of 160 g. of benzene, 143 g. of isopentane and 5 g. of aluminum chloride. The temperature of the reaction was slowly raised from 20° to 40° C. during the first hour, and maintained at a temperature of 40° C. during the remainder of the addition and for a 7 hour period following the completion of the addition of the haloalkene. At the end of this time, the clear, dark amber upper layer (309 g.) was decanted from 17 g. of dark amber sludge, washed with water and alkali, dried and subjected to fractional distillation. 14 g. (10% of the theoretical) of pentylbenzene (chiefly 2-phenyl-3-methylbutane) and 22 g. (12% of the theoretical) of 1,2-diphenylethane (i. e. bibenzyl) was separated therefrom.

The advantage of using a saturated hydrocarbon containing a tertiary carbon atom to obtain greater yields of mono-alkylated aromatic hydrocarbon was shown by repeating the above reaction in the absence of a saturated hydrocarbon.

A solution of 97 g. of trans-dichloroethylene dissolved in 40 g. of benzene was slowly added with stirring during 2.5 hours to a mixture of 160 g. of benzene and 5 g. of aluminum chloride. The temperature of the reaction was slowly raised from 24° C. to 40° C. during the first hour and maintained at 40–50° C. during the remainder of the addition. The resulting mixture was subsequently stirred for a period of approximately 4 hours at 40–50° C. The upper layer was decanted from the lower catalyst layer, washed, dried and subjected to fractional distillation. The only reaction product isolated was 6 g. of bibenzyl (3% of the theory).

*Example II*

A solution of 66 g. of trichloroethylene in 40 g. of benzene was added during 4.3 hours to a stirred mixture of 200 g. of benzene, 240 g. of isopentane, and 5 g. of aluminum chloride at 35–42° C. The product was stirred at this temperature for an additional six hours after which the 442 g. of upper layer was separated from the 18 g. of lower layer, washed, dried and fractionated. There was obtained 30 g. of pentylbenzene (20% of the theory based on the theoretical yield of 2.0 moles of pentylbenzene per mole of trichloroethylene in accordance with the mechanism proposed below) and 22 g. of 1,2-diphenylethane (22% yield).

When the reaction was carried out in the absence of saturated hydrocarbon at the same temperature or at a higher temperature, 58–60° C., little reaction occurred. No bibenzyl was obtained. 1,1,2-triphenylethane and 1,1,2,2-tetraphenylethane were isolated in about 2 and about 4% yields, respectively.

The reactions which occur may be illustrated by the following equations:

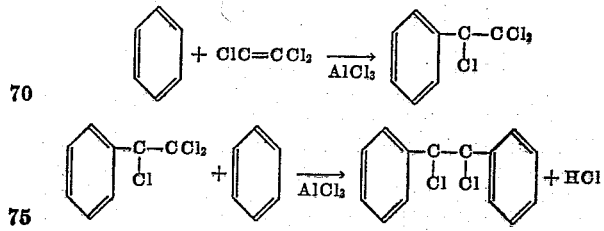

In the presence of a saturated hydrocarbon, RH

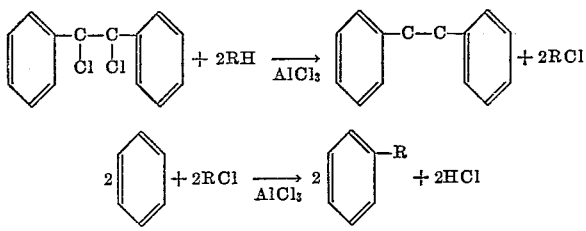

The overall reaction is

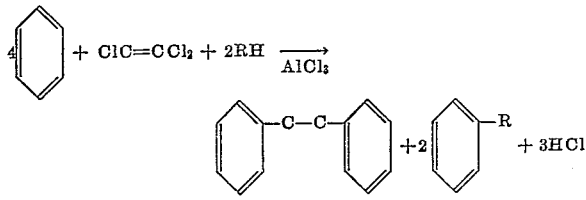

In the absence of a saturated hydrocarbon:

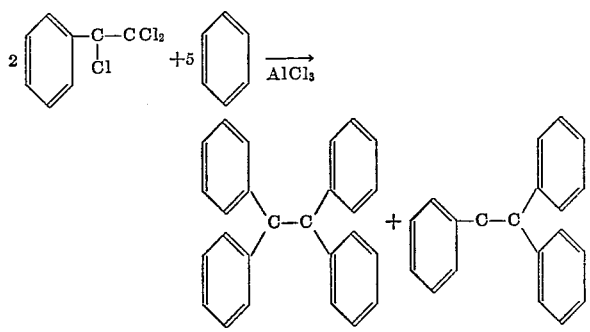

*Example III*

38 g. of allyl chloride dissolved in 40 g. of benzene was added gradually during 0.9 hour to a stirred mixture of 160 g. of benzene, 126 g. of methylcyclopentane and 5 g. of aluminum chloride in an alkylating flask at 3–6° C. Stirring was continued for 1.8 hours at this temperature, after which the clear upper layer (332 g.) was decanted from the lower catalyst layer (30 g.) washed, dried and subjected to fractional distillation. There was obtained 6 g. of n-propylbenzene, 15 g. of (methylcyclopentyl)benzene, and 14 g. of 1,2-diphenylpropane, corresponding to 10%, 19% and 14% yields, respectively.

The above experiment was repeated in the absence of methylcyclopentane or other saturated hydrocarbon, a solution of 78 g. of allyl chloride in 80 g. of benzene being added to a stirred solution of 5 g. of aluminum chloride in 10 g. of nitromethane and 240 g. of benzene at 3–6° C. Distillation of the washed and dried product gave a 28% yield of (2-chloropropyl)benzene and an 8% yield of 1,2-diphenyl-propane.

*Example IV*

44 g. of isocrotyl chloride in 40 g. of benzene was added to a solution comprising 147 g. of methylcyclohexane, 160° g. of benzene and 5 g. of aluminum chloride at 2–4° C. during a period of 1.0 hour. The reaction mixture was stirred at a temperature of approximately 3° C. for an additional period of 1.9 hours, at the end of which time the 362 g. of upper layer was decanted from the 18 g. of lower catalyst layer, washed, dried and subjected to fractional distillation. 30 g. of isobutylbenzene, 45 g. of (methylcyclohexyl)benzene, and 17 g. of (isobutylphenyl)methylcyclohexane amounting to 42%, 58%, and 16% yields, respectively, were recovered during said distillation.

The above experiment was repeated in the absence of a saturated hydrocarbon. 45 g. of isocrotyl chloride dissolved in 40 g. of benzene was slowly added during 1.1 hours to a stirred mixture of 160 g. of benzene and 5 g. of aluminum chloride in an alkylating flask at 5–7° C. The resulting mixture was stirred at this temperature for an additional 1.3 hours after which the upper layer (213 g.) was decanted from the 25 g. lower catalyst layer, washed, dried and subjected to fractional distillation. 54 g. (52% yield) of 1,2-diphenyl-2-methylpropane was recovered from the reaction product.

*Example V*

The reaction of methallyl chloride with benzene and methylcyclohexane in the presence of aluminum chloride at 2–4° C. following the procedure of Example IV resulted in a 39% yield of isobutylbenzene, a 52% yield of (methylcyclohexyl)benzene, and a 19% yield of (isobutylphenyl)methylcyclohexane.

I claim as my invention:

1. A process for the production of derivatives of aromatic compounds which comprises reacting an aromatic compound selected from the group consisting of aromatic hydrocarbons, anilines and nuclearly substituted hydroxy and halogen derivatives of aromatic hydrocarbons with a haloalkene and a saturated hydrocarbon containing a tertiary carbon atom in the presence of a Friedel-Crafts catalyst, and recovering the resultant aromatic derivatives.

2. A process for the production of derivatives of aromatic hydrocarbons which comprises reacting an alkylatable aromatic hydrocarbon containing a replaceable hydrogen atom with a chloroalkene and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant aromatic derivatives.

3. A process for the production of derivatives of aromatic hydrocarbons which comprises reacting an alkylatable aromatic hydrocarbon containing a replaceable hydrogen atom with a polychloroalkene and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant aromatic derivatives.

4. A process for the production of derivatives of aromatic hydrocarbons which comprises reacting an alkylatable aromatic hydrocarbon containing a replaceable hydrogen atom with a monochloroalkene and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant aromatic derivatives.

5. A process for the production of derivatives of aromatic hydrocarbons which comprises reacting an alkylatable aromatic hydrocarbon containing a replaceable hydrogen atom with a dichloroalkene and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant aromatic derivatives.

6. A process for the production of derivatives of aromatic hydrocarbons which comprises reacting an alkylatable aromatic hydrocarbon containing a replaceable hydrogen atom with a trichloroalkene and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant aromatic derivatives.

7. A process for the production of derivatives of aromatic hydrocarbons which comprises reacting an aromatic hydrocarbon containing a replaceable hydrogen atom with a haloalkene and an isoparaffin in the presence of a Friedel-Crafts type catalyst selected from the group consisting of aluminum chloride, aluminum bromide, zirconium chloride and boron fluoride, and recovering the resultant aromatic derivatives.

8. A process for the production of derivatives of aromatic hydrocarbons which comprises reacting an aromatic hydrocarbon containing a replaceable hydrogen atom with a haloalkene and an alkylcycloparaffin in the presence of a Friedel-Crafts type catalyst selected from the group consisting of aluminum chloride, aluminum bromide, zirconium chloride and boron fluoride, and recovering the resultant aromatic derivatives.

9. A process for the production of derivatives of aromatic hydrocarbons which comprises reacting an aromatic hydrocarbon with a chloroalkene containing a replaceable hydrogen atom and isopentane in the presence of a Friedel-Crafts type catalyst selected from the group consisting of aluminum chloride, aluminum bromide, zirconium chloride and boron fluoride, and recovering the resultant aromatic derivatives.

10. A process for the production of derivatives of aromatic hydrocarbons which comprises reacting an aromatic hydrocarbon containing a replaceable hydrogen atom with a chloroalkene and methylcyclopentane in the presence of a Friedel-Crafts type catalyst selected from the group consisting of aluminum chloride, aluminum bromide, zirconium chloride and boron fluoride, and recovering the resultant aromatic derivatives.

11. A process for the production of derivatives of aromatic hydrocarbons which comprises reacting an aromatic hydrocarbon containing a replaceable hydrogen atom with a chloroalkene and methylcyclohexane in the presence of a Friedel-Crafts type catalyst selected from the group consisting of aluminum chloride, aluminum bromide, zirconium chloride and boron fluoride, and recovering the resultant aromatic derivatives.

12. A process for the production of derivatives of aromatic hydrocarbons which comprises reacting an alkylatable aromatic hydrocarbon containing a replaceable hydrogen atom with a haloalkene and a saturated hydrocarbon containing a tertiary carbon atom in the presence of aluminum chloride, and recovering the resultant aromatic derivatives.

13. A process for the production of derivatives of aromatic hydrocarbons which comprises reacting an alkylatable aromatic hydrocarbon containing a replaceable hydrogen atom with a haloalkene and a saturated hydrocarbon containing a tertiary carbon atom in the presence of aluminum bromide, and recovering the resultant aromatic derivatives.

14. A process for the production of derivatives of aromatic hydrocarbons which comprises reacting an alkylatable aromatic hydrocarbon containing a replaceable hydrogen atom with a haloalkene and a saturated hydrocarbon containing a tertiary carbon atom in the presence of zirconium chloride, and recovering the resultant aromatic derivatives.

15. A process for the production of derivatives of aromatic hydrocarbons which comprises reacting an alkylatable aromatic hydrocarbon containing a replaceable hydrogen atom with a haloalkene and a saturated hydrocarbon containing a tertiary carbon atom in the presence of boron fluoride, and recovering the resultant aromatic derivatives.

16. A process for the production of derivatives of benzene which comprises reacting benzene with a haloalkene and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant benzene derivatives.

17. A process for the production of derivatives of benzene which comprises reacting benzene with allyl chloride and methylcyclopentane in the presence of aluminum chloride, and recovering the resultant n-propylbenzene and (methylcyclopentyl)benzene.

18. A process for the production of derivatives of benzene which comprises reacting benzene with methallyl chloride and methylcyclohexane in the presence of aluminum chloride, and recovering the resultant isobutylbenzene and (methylcyclohexyl)benzene.

19. A process for the production of derivatives of benzene which comprises reacting benzene with isocrotyl chloride and methylcyclohexane in the presence of aluminum chloride, and recovering the resultant isobutylbenzene and (methylcyclohexyl)benzene.

20. A process for the production of derivatives of benzene which comprises reacting benzene with 1,2-dichloroethylene and isopentane in the presence of aluminum chloride, and recovering the resultant 1,2-diphenylethane and pentylbenzene.

References Cited in the file of this patent
UNITED STATES PATENTS

| | | |
|---|---|---|
| 2,673,224 | Kennedy | Mar. 23, 1954 |
| 2,681,373 | Schneider | June 15, 1954 |